United States Patent [19]

Voyles

[11] 4,288,842
[45] Sep. 8, 1981

[54] SOLID CHIP CAPACITOR AND METHOD OF MANUFACTURE

[75] Inventor: Gerald A. Voyles, Indianapolis, Ind.

[73] Assignee: Emhart Industries, Inc., Indianapolis, Ind.

[21] Appl. No.: 47,020

[22] Filed: Jun. 11, 1979

[51] Int. Cl.³ ............ H01L 23/28; H01G 9/00; B01J 17/00

[52] U.S. Cl. ............ 361/433; 357/72; 29/570; 29/589

[58] Field of Search ............ 361/433; 357/72; 29/589

[56] References Cited

U.S. PATENT DOCUMENTS

| | | | |
|---|---|---|---|
| 3,550,228 | 12/1970 | Asscher | 29/589 |
| 3,579,813 | 5/1971 | Tomiwa | 361/433 |
| 3,588,628 | 6/1971 | Peck | 361/433 |
| 3,855,505 | 12/1974 | Karlik et al. | 361/433 |
| 4,097,985 | 7/1978 | Morimoto | 361/433 |
| 4,107,762 | 8/1978 | Shirn et al. | 361/433 |

Primary Examiner—Andrew J. James
Attorney, Agent, or Firm—Robert F. Meyer; David W. Gomes

[57] ABSTRACT

A polarized chip capacitor is encapsulated within an insulative material which forms a substantially rectangular member. The exposed portion of the leads exit from oppositely facing, substantially vertical walls of the member. Both leads cover a lower portion of the substantially vertical wall from which they exist and a portion of the bottom of the member. The polarized capacitor rests on and is capable of being electrically connected to a substrate through the wrapped leads. A method for manufacturing a chip capacitor includes the steps of electrically connecting a lead to each the anode and cathode and then encapsulating the capacitor within an insulative material. The exposed portions of the leads are folded towards each other to substantially conform to the exterior shape of the encapsulated capacitor.

8 Claims, 5 Drawing Figures

SOLID CHIP CAPACITOR AND METHOD OF MANUFACTURE

FIELD OF THE INVENTION

This invention relates to encapsulated capacitors and more particularly to polarized encapsulated chip capacitors having wrap-around leads and to a method of manufacturing chip capacitors.

BACKGROUND OF THE INVENTION

Encapsulated capacitors have been manufactured in many configurations. Finished capacitors have been mounted on various substrates in various manners. In the early days of electronics these components were relatively large and were put in place and electrically connected to a circuit board by hand. The polarity of polar capacitors was easily marked on and easily read from the relatively large surfaces of the components.

In recent years as a result of trends towards miniaturization and automation many types of capacitors have become much smaller. They also have become more adapted for automated manufacturing and automated assembly onto substrates or into the equipment using them.

The reduction in surface area of the capacitors has decreased the area where printed markings could be made, such as those used to indicate polarity. This created the need for another method of indicating polarity. Further, automated equipment does not generally respond to printed markings and requires a polarity indicator adapted to its capabilities.

Various forms of asymetrical packaging have previously been suggested to indicate polarity. These include chamfers and unequally sized terminals. These previous forms have not all been adaptable to high speed manufacturing methods, nor met many of the other requirments imposed by capacitor users.

The miniaturization of components and new automated equipment has permitted the dense packing of components on a substrate. The high density of components has increased the likelihood of intercomponent shorting due to the closeness of exposed component leads. Further, the dense packing of substrates within many devices has also created the possibility of a conductive portion of a component on one substrate being electrically connected to a component on another substrate. The reduction of the potential for unwanted component interconnection has therefore become an important factor in the design of chip capacitors.

Simply designing a chip capacitor which meets solely the requirements of the capacitor user is alone insufficient for a useable chip capacitor. Densely packed substrates having many chip capacitors, and devices having large numbers of substrates require a method of producing the chip capacitors in large numbers at a high efficiency. Previously known chip capacitors were not adaptable to high efficiency production means required to produce these large numbers of chip capacitors at an acceptable cost per unit with acceptable electrical and physical characteristics.

An efficient manufacturing method has many requirements of its own. The small size of the various elements of the capacitor makes them very sensitive to physical damage during manufacture and subsequent handling. An efficient manufacturing method will not damage any of the elements and produces a finished capacitor not exhibiting the high leakage currents and other poor electrical characteristics produced by physical damage of the capacitor elements and connections. Further, an acceptable method will have a minimum number of steps reducing costs, time and equipment requirements.

THE INVENTION

A polarized chip capacitor has now been discovered that solves many of the problems previously associated with such components. The capacitor comprises an anode, a cathode assembly, a dielectric, a lead electrically connected to the anode, and a second lead connected to the cathode assembly. The anode, the dielectric, the cathode assembly and the portions of the leads electrically connected to the anode and cathode assembly are encapsulated within an insulative material.

The present invention has the form of a substantially rectangular box or member. The exposed portions of the leads exit from opposing, substantially vertical walls of the member with a positive lead exiting at a point closer to the bottom of the member than a negative lead. Both leads are wrapped around the member and cover a portion of the substantially vertical walls and a portion of the bottom of the member. The encapsulated portion of the polarized capacitor rests on and is capable of being electrically connected to a substrate through leads which have been wrapped around or conformed to the exterior surface of the substantially rectangular member.

The wrapped leads preferably cover only a portion of the bottom and a portion of two of the sides of the encapsulated polarized capacitor. Thus the area of exposed leads which can cause unwanted intercomponent connections is consequently small. Since the electrical connection to the substrate can be made at a point under the capacitor there are no leads projecting from the capacitor, thereby removing another source of possible short circuits.

The simple capacitor of the present invention lends itself to a novel and efficient high volume method of manufacture which previously known chip capacitors have failed to do. By the method of the present invention, a chip capacitor is manufactured having a plurality of elements which comprises an anode, a cathode assembly, a dielectric, and at least two leads. The method comprises the steps of placing a preform of a capacitor element comprising the anode, cathode assembly on one pair of leads which form part of a conductive frame having more than one pair of leads and electrically connecting one pair of leads to the anode and cathode assembly of the preform. The capacitor element preform and a portion of the leads attached thereto are encapsulated within an insulative material, then the leads are separated from the conductive frame. The exposed portion of the leads are folded towards each other to substantially conform to the exterior shape of the encapsulated elements whereby the leads are wrapped around the encapsulated elements.

The electrical component and method of manufacture of the present invention will be better understood by reference to the following drawings and discussion.

DETAILED DESCRIPTION OF THE INVENTION

Figure 1:
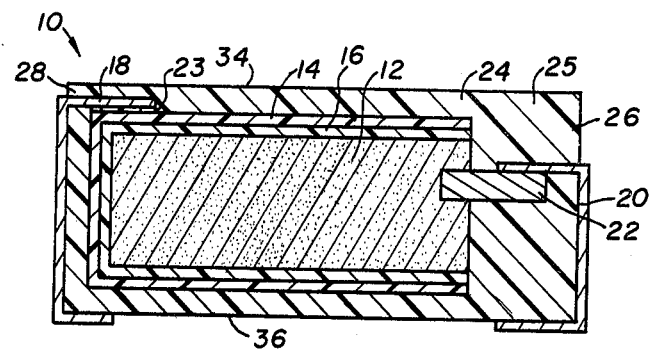
FIG. 1 is a cross section of an embodiment of the present invention.
Figure 2:
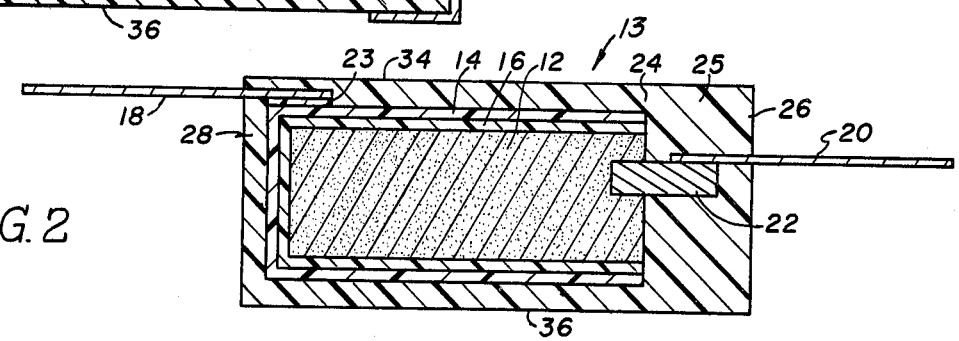
FIG. 2 is a cross section of the embodiment of the present invention before the leads have been conformed to the insulative encapsulation.

An embodiment of the present invention is depicted in cross section in FIGS. 1 and 2. The embodiment includes a chip capacitor 10 having an anode 12, a cathode assembly 13, a dielectric (not shown) and at least two leads 18 and 20. Anode 12 is a sintered and anodized valve metal made in a conventional manner well known in the art. Valve metals include tantalum, aluminum, molybdenum, tungsten, and niobrium with tantalum being preferred. A layer of tantalum oxide (not shown) serves as the capacitor dielectric.

Cathode assembly 13 includes a solid electrolyte 16 which serves as a cathode and a cathode connection member 14. A suitable electrolyte would be manganese dioxide, for example. Other electrolytes that are compatible with the anode and cathode connection member 14 such as semiconducting metal oxides such as the oxides of iron, manganese, nickel, cobalt, chromium, zinc and lead may be used. The member 14 is deposited or placed around electrolyte 16 and typically is comprised of carbon or a carbon aqueous dispersion deposited on the solid electrolyte followed by silver paint to provide reduction of series resistance and a means for connecting a lead to the cathode connection member 14.

An anode riser 22 is embedded in the anode 12 before sintering or attached, as by welding, after sintering. The anode riser 22 can be any conductive material but is preferably made of the same valve metal as the anode 12.

The positive lead 20 is electrically attached to the anode riser 22 by welding. The negative lead 18 can be similarly attached to the cathode connection member 14 by a conductive adhesive or soldering or welding. In the embodiment shown in FIG. 1 the negative lead 18 is shown attached to the member 14 by a silver filled epoxy 23 while the positive lead 20 is shown welded to the anode riser 22. The leads 18, 20 can be made of any conductive material which is compatible with the anode 12, cathode connection member 14, and electrolyte 16. The preferred lead material is nickel.

The anode 12, member 14, electrolyte 16, anode riser 22 and portions of the leads 18, 20 are encapsulated within an insulative material 24. The encapsulation can be performed by many of the well known methods known in the art. Preferably, the insulative material 24 is an epoxy, cast or molded around the various elements of the capacitor 10. Other moldable or castable insulative materials can also be used. Included are such groups of insulative materials as the phenolics, the polystyrenes, the acrylics, the polyesters and many silicone compounds.

The insulative material 24 packages the various elements of the capacitor 10 and protects them from contamination by the environment. Many of the elements of the capacitor 10 are very sensitive to, among others, salts and moisture. Further, the elements of the capacitor 10, due to their small size and chemical composition, are very fragile. The encapsulation protects the elements during assembly whether automated or not, onto a substrate (not shown) and during the subsequent handling of the substrate itself.

Figure 4:
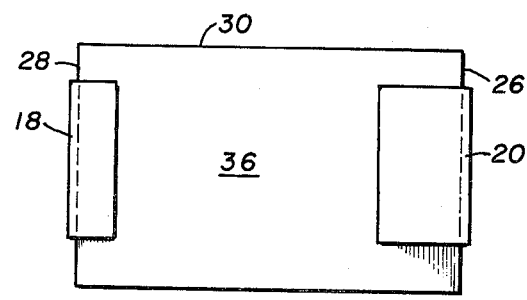
FIG. 4 is a bottom plan view of the embodiment of the present invention.

The encapsulated capacitor 10 is shown in FIGS. 1, 2, 4 and 5 as having the form of a substantially rectangular box or member 25 with two leads 18 and 20 wrapped around the member 25. This is the preferred shape for the present invention. The relative dimensions shown for height, width and depth are purely illustrative. In the practice of the invention, many variations in the ratio of height:width:depth can be used depending partially on the volume occupied by the anode 12, cathode connection member 14 and electrolyte 16. The vertical walls 26, 28 (walls 30, 32 are shown in FIG. 4) and top 34 and bottom 36 surfaces of the capacitor 10 are shown as being vertical and horizontal respectively. Due to requirements of the manufacturing techniques, the walls 26, 28, 30, 32 and other surfaces 34, 36 may not be absolutely vertical and horizontal but may only be substantially so. This is also within the scope of the present invention.

The positive 20 and negative 18 leads are so positioned within the capacitor 10 or the leads 18, 20 so shaped (not shown) that the positive lead 20 emerges from a substantially vertical wall 26 which is opposite that of the negative lead 18. Further, the positive lead 20 emerges from the wall 26 of the capacitor 10 at a position nearer the bottom 36 of the capacitor 10 than the negative lead 18. This can be clearly seen in FIGS. 1, 2 and 5.

The difference in points of emergence of the leads 18 and 20 can be used to indicate the polarity of the capacitor 10. This particular physical difference is not only easily discernable to a human operator, but can also be used by automated equipment to indicate the polarity of the capacitor 10. Further, the indication of polarity is indelible being built into the capacitor and not being eraseable or easily made illegible.

Figure 5:
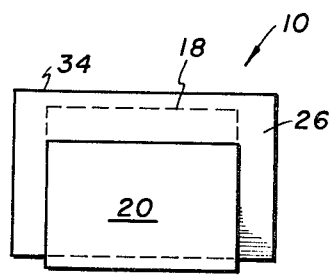
FIG. 5 is a side plan view of the embodiment of the present invention.

The positive 20 and negative 18 leads shown in FIG. 5 are disclosed as being of equal width but narrower than the side walls 26, 28 of the capacitor 10. By sizing leads 18 and 20 of the present embodiment narrower than the side walls 26, 28 that they cover, electrical contact with the leads 18 and 20 can only be made along the side walls 26 and 28. Electrical contact at the other two side walls 30, 32 which are shown in FIG. 4 is made impossible. This is an advantage with a device (not shown) having tightly packed substrates, wherein the distance separating adjacent components is very small and the possibility of inadvertent intercomponent connection very strong.

The leads 18 and 20 are shown in FIGS 1, 4 and 5 as being wrapped around the member 25 by being conformed to the substantially vertical walls 26, 28 of the insulative member 25 of the capacitor 10 and to a portion of the bottom wall 36 (shown in FIG. 4). The capacitor 10 rests on the leads 18, 20 when the capacitor 10 is placed on a circuit board or substrate (not shown). The portion of the leads 18 and 20 which lie along the bottom wall 36 can preferably be used to make electrical contact with the circuit board or other conductive substrates. Such connection is usually made by soldering, employing various methods well known in the art.

The area of the bottom wall 36 covered by the leads 18 and 20 can be varied by altering the length and width of the leads 18 and 20. Since the leads 18 and 20 do not project away from the capacitor 10, but are folded inward, towards each other, electrical contact to the capacitor 10 can be made under the capacitor 10. The chances of unwanted electrical contact with other components on or off the substrate caused by contact with exposed leads are greatly reduced. Further, by making electrical connection under the capacitor 10, other components on the substrate can be placed closer to the capacitor 10. This is due to the absence of projecting electrical terminals and reduced areas of exposed solder.

From FIGS. 1, 2 and 5 we see that the leads 18 and 20 do not extend to or beyond the top 34 of the capacitor 10. The top 34 of the capacitor 10 being completely insulative eliminates the possibilities of unwanted electrical contact at the top 34 of the capacitor 10. Such a feature is especially important when many substrates or circuit boards are densely stacked in a device or when the top of the circuit board comes into close proximity to another conductive material. Many previously known chip capacitors were constructed with conductive leads along their top surfaces and are prone to unwanted electrical interconnection with other components.

A method of manufacturing a chip capacitor, such as the one illustrated in FIGS. 1 and 2, comprises the steps of placing a capacitor element preform comprising the anode 12, cathode 14, electrolyte 16 on one pair of leads 18, 20 which form part of a conductive frame 50 having more than one pair of leads (shown in FIG. 3), electrically connecting one pair of the leads 20, 18 to the anode 12 (via the anode riser 22) and cathode connection member 14 respectively. The anode 12, anode riser 22, cathode connection member 14, electrolyte 16 which is disposed between the anode 12 and member 14, and the portion of the leads 18 and 20 attached to the member 14 and anode 12 respectively, are then encapsulated within an insulative material 24, forming the substantially rectangular box or member 25. The capacitor 10, subsequent to encapsulation, is shown in FIG. 2.

Figure 3:
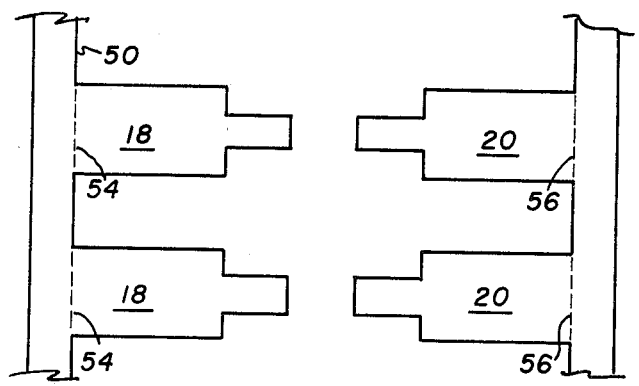
FIG. 3 is a top plan view of a section of a conductive frame.

After encapsulation the leads 18, 20 are separated from the conductive frame 50 at points shown as dotted lines 54 and 56 in FIG. 3, and the exposed portions of the leads 18 and 20 are folded toward each other so as not to touch. The leads 18 and 20 are substantially conformed to the exterior shape of the member 25 by wrapping the leads 18, 20 around the member 25. In FIG. 1, the leads 18 and 20 are shown conformed to the substantially vertical walls 26, 28 and to the bottom wall 36 of the member 25. The anode 12, anode riser 22, cathode connection member 14 and electrolyte 16 are assembled and the leads 18 and 20 are attached thereto as previously described.

An advantage of the present invention is that the chip capacitors can be manufactured in a continuous process. The assembled elements 12, 14 and 16 are fed in along with the conductive frame 50 which can contain an indeterminate number of pairs of leads 18, 20. As the leads 18, 20 are attached they can be cut off, encapsulated and folded as new leads 18, 20 are exposed and new preforms are added. A continuous process employing leads 18, 20 held rigidly to the continuous conductive frame 50, reduces stress on and subsequent damage to the capacitor elements 12, 14, 16 and 22 and to the connection of the leads 18 and 20 to the cathode 14 and anode riser 22 respectively. The reduction of such physical stress and damage has been found to reduce the leakage current of the chip capacitor and also improve many of the other electrical characteristics of it.

In another embodiment of the invention, the conductive frame 50 has a fixed number of paired conductive leads 18, 20. The number of paired leads 18, 20 is chosen to fit into a preexisting mold (not shown). The leads 18, 20 and the capacitor element preforms comprising the anode 12, cathode connection member 14 and electrolyte 16, are placed into a mold. A preform is placed on each pair of leads in the mold and the leads 18, 20 are electrically connected to the member 14 and anode 12 respectively. After electrical connection, the preforms and leads 18, 20 attached thereto are encapsulated in an insulative material 24 forming the member 25. The encapsulation can be done in the mold, or in a separate apparatus. The leads 18, 20 are cut from the frame 50 at points 54, 56 producing the capacitor 10 shown in FIG. 2 and then conformed to or wrapped around the member 25 producing the capacitor 10 shown in FIG. 1. Alternatively the leads 18, 20 are wrapped around the member 25 before being cut from the conductive frame 50, again producing the capacitor 10 shown in FIG. 1.

In FIGS. 1, 2 and 3 the length, width and thickness of the leads 18 and 20 are shown to be a certain ratio and they are shown as being flat and indentical. These are not required in the present invention, the length, width and thickness of the leads 18 and 20 can be varied in any way necessary to fit the requirements of the capacitor user and for the advantages discussed previously. Further bends (not shown) can be introduced into the leads 18 and 20 to alter the point at which they project from the member 25 and to further help relieve strain on the connection between the leads 18 and 20, and the cathode 14 and anode user 22 respectively. As previously discussed, varying the points at which the leads 18 and 20 emerge from the walls 26, 28 of the member 25 can be used to indicate polarity, as shown in FIGS. 1, 2 and 5.

The preceeding discussion has centered on the capacitor 10 shown in FIGS. 1, 2, 4 and 5, but the present invention is not limited to the chip capacitor shown. Other chip capacitors having wrapped leads meeting the requirements set forth above are also included within the scope of the present invention. Further chip capacitors manufacturable by the method disclosed herein are also within the scope of the present invention as defined in the following claims.

What is claimed is:

1. A method of manufacturing a chip capacitor having a plurality of elements which comprises an anode, a dielectric, a cathode connection member, two leads, and an electrolyte disposed between said anode and said cathode connection member; said method comprising the steps of placing a capacitor element preform substantially rectangular in cross section having opposed end and side walls and comprising said anode, cathode connection member and electrolyte on one pair of leads which form part of a conductive frame having more than one pair of leads, electrically connecting one each of said pair of leads to the anode and cathode connection member at opposed ends of said preform, encapsulating said preform and a portion of said leads attached thereto within an insulative material so as to expose said leads separately at said opposing end walls, separating said leads from the conductive frame, and folding the exposed portion of said leads towards each other to substantially conform to the exterior shape of the encapsulated elements whereby said leads are wrapped around the encapsulated element to partially cover said opposing end walls and one of said side walls, with the cathode lead covering more of its end wall than the anode lead covering its end wall.

2. The method of claim 1 wherein said conductive frame contains an indeterminate number of pairs of leads.

3. The method of claim 1 wherein said conductive frame comprises a fixed number of lead pairs; and further comprising the steps of placing said conductive frame with the fixed number of lead pairs in a mold and placing a preform on each pair of leads in the mold.

4. The method of claim 1 wherein said anode is comprised of a sintered and anodized metal.

5. The method of claim 4 wherein said metal is tantalum.

6. A polarized chip capacitor comprising an anode; a cathode connection member; an electrolyte disposed between said anode and said cathode connection member; a positive lead electrically connected to said anode; a negative lead attached to said cathode connection member; said anode, said cathode connection member, said electrolyte and portions of said leads electrically connected thereto encapsulated within an insulative material which is in the form of a substantially rectangular member in cross section having opposed end and side walls, the exposed portions of said positive and negative leads exiting individually from one each of said end walls of the rectangular member, with the positive lead exiting at a point closer to a side wall of the rectangular member than the negative lead, each lead of said positive and negative leads covers a portion of its end wall it exits from and a portion of the side wall of the rectangular member whereby said leads are wrapped around the rectangular member; and said polarized capacitor rests on and is capable of being electrically connected to a substrate through said leads.

7. The component of claim 6 wherein said anode is comprised of a sintered and anodized metal.

8. The capacitor of claim 7 wherein said metal is tantalum.

* * * * *